(12) United States Patent  (10) Patent No.: US 7,008,196 B2
Hokkirigawa et al.  (45) Date of Patent: Mar. 7, 2006

(54) ELECTRICALLY MOTORIZED PUMP HAVING A SUBMERSIBLE SLEEVE BEARING

(75) Inventors: Kazuo Hokkirigawa, Sendai (JP); Motoharu Akiyama, Miyota-Machi (JP); Morinobu Kawamura, Miyota-Machi (JP)

(73) Assignee: Minebea Co. Ltd., (JP)

( * ) Notice: Subject to any disclaimer, the term of this patent is extended or adjusted under 35 U.S.C. 154(b) by 0 days.

(21) Appl. No.: 10/798,026

(22) Filed: Mar. 11, 2004

(65) Prior Publication Data

US 2004/0258544 A1 Dec. 23, 2004

Related U.S. Application Data

(63) Continuation-in-part of application No. 10/387,021, filed on Mar. 12, 2003.

(30) Foreign Application Priority Data

Mar. 11, 2003 (JP) ............................. 2003-065721

(51) Int. Cl.
  *F04B 17/03* (2006.01)
(52) U.S. Cl. ............................. 417/423.3; 417/423.12
(58) Field of Classification Search ................ 384/112, 384/415; 417/423.3, 423.12
  See application file for complete search history.

(56) References Cited

U.S. PATENT DOCUMENTS

| 2,663,599 | A | * | 12/1953 | Mackay et al. ............. 384/415 |
| 4,115,283 | A | | 9/1978 | Needham |
| 4,196,013 | A | | 4/1980 | Dannenberg et al. |
| 4,466,932 | A | | 8/1984 | Koyama et al. |
| 4,699,573 | A | | 10/1987 | Petrie et al. |
| 4,877,813 | A | | 10/1989 | Jinno et al. |
| 5,039,286 | A | * | 8/1991 | Point et al. .............. 417/423.3 |
| 5,236,784 | A | | 8/1993 | Kobayashi et al. |
| 5,281,032 | A | | 1/1994 | Slocum |
| 5,346,737 | A | | 9/1994 | Takahashi et al. |
| 5,360,633 | A | | 11/1994 | Dean |
| 5,432,213 | A | | 7/1995 | Kim et al. |
| 5,432,224 | A | | 7/1995 | Ryuhgoh et al. |
| 5,549,394 | A | | 8/1996 | Nowak et al. |
| 5,591,279 | A | | 1/1997 | Midorikawa et al. |
| 5,641,275 | A | | 6/1997 | Klein et al. |
| 5,697,709 | A | | 12/1997 | Mori et al. |

(Continued)

FOREIGN PATENT DOCUMENTS

DE 2119917 4/1971

(Continued)

OTHER PUBLICATIONS

European Search Report—Application No. EP 03 44 7156.

(Continued)

*Primary Examiner*—Michael Koczo, Jr.
(74) *Attorney, Agent, or Firm*—Schulte Roth & Zabel, LLP; Joel E. Lutzker; Anna Vishev

(57) ABSTRACT

The electrically motorized pump has a low energy loss because it uses of the shaft and the sleeve made from synthetic resin composition obtained by uniformly dispersing fine powder of RBC or CRBC in a resin. The typical process for the production of a synthetic resin composition for making the sleeve bearing for the pump for use in water includes kneading with a resin the fine powder of RBC or CRBC at a temperature in the neighborhood of the melting point of the resin, and thereby uniformly dispersing the fine powder of RBC or CRBC in the resin. Fibers, such as glass fibers, may be blended with the fine powder of RBC or CRBC and the resin.

22 Claims, 4 Drawing Sheets

U.S. PATENT DOCUMENTS

| | | | |
|---|---|---|---|
| 5,730,916 | A | 3/1998 | Kunzel et al. |
| 5,762,699 | A | 6/1998 | McGovern |
| 5,879,791 | A | 3/1999 | Kato et al. |
| 5,916,499 | A | 6/1999 | Murayama et al. |
| 5,947,610 | A * | 9/1999 | Feldbauer et al. .......... 384/112 |
| 6,033,118 | A | 3/2000 | Asai et al. |
| 6,095,770 | A | 8/2000 | Obata et al. |
| 6,109,887 | A | 8/2000 | Takura et al. |
| 6,129,529 | A * | 10/2000 | Young et al. ............ 417/423.3 |
| 6,193,793 | B1 | 2/2001 | Long et al. |
| 6,342,088 | B1 | 1/2002 | Klatt et al. |
| 6,395,677 | B1 | 5/2002 | Hokkirigawa et al. |
| 6,448,307 | B1 | 9/2002 | Medoff et al. |
| 6,472,042 | B1 | 10/2002 | Dibbern et al. |
| 6,494,928 | B1 | 12/2002 | Hokkirigawa et al. |
| 6,550,508 | B1 | 4/2003 | Yamaguchi et al. |
| 6,573,215 | B1 | 6/2003 | Hokkirigawa et al. |
| 6,712,517 | B1 * | 3/2004 | Hokkirigawa et al. ...... 384/279 |
| 6,787,075 | B1 * | 9/2004 | Hokkirigawa et al. ..... 264/29.4 |
| 2002/0111388 | A1 | 8/2002 | Hokkirigawa et al. |
| 2002/0114548 | A1 | 8/2002 | Hokkirigawa et al. |
| 2002/0114549 | A1 | 8/2002 | Hokkirigawa et al. |
| 2002/0152644 | A1 | 10/2002 | Hokkirigawa et al. |
| 2002/0152694 | A1 | 10/2002 | Hokkirigawa et al. |
| 2002/0152697 | A1 | 10/2002 | Hokkirigawa et al. |
| 2002/0174605 | A1 | 11/2002 | Hokkirigawa et al. |
| 2002/0174771 | A1 | 11/2002 | Hokkirigawa et al. |
| 2002/0175118 | A1 | 11/2002 | Hokkirigawa et al. |
| 2002/0192469 | A1 | 12/2002 | Hokkirigawa et al. |
| 2003/0134104 | A1 | 7/2003 | Hokkirigawa et al. |
| 2003/0220421 | A1 | 11/2003 | Hokkirigawa et al. |

FOREIGN PATENT DOCUMENTS

| | | |
|---|---|---|
| DE | 23 45 460 | 3/1975 |
| JP | 10-219031 | 8/1998 |
| JP | 2001-304263 | 10/2001 |
| RU | 1 1835412 A1 | 8/1993 |
| WO | WO 93/23459 | 11/1993 |

OTHER PUBLICATIONS

H. Ilzuka et al., "Mechanical Properties of Porous Carbon Materials I.E. Woodceramics," 15 Journal of Materials Science Letters, 1770-72 (1996).

K. Hokkirigawa, "Wear Mode Map of Ceramics," Wear 151, pp. 219-228.

K. Hokkirigawa, "Wear Mode Map of Ceramics," Wear of Materials 353-358 (1991).

K. Adachi et al., "The Wear Mechanism of Silicon Nitride In Rolling-Sliding Contact," Wear of Materials, pp. 333-338 (1991).

K. Hokkirigawa, "Advance Techniques For In-Situ Observations of Microscopic Wear Processes," Surface Modification Technologies VIII, pp. 93-105 (1995).

K. Adachi et al., "The Wear Mechanism of Silicon Nitride in Rolling-Sliding Contact," Wear, 151, pp. 291-300 (1991).

H. Kitsunai et al., "Transitions of Microscopic Wear Mechanism for Cr2O3 Ceramic Coatings During Repeated Sliding Observed in a Scanning Electron Microscope Tribosystem," Wear, 151, (1991) pp. 279-289.

K. Hokkirigawa, "Development and Application of Rice Bran Ceramics As A New Tribo-Material," Proceedings of the International Tribology Conference, Nagasaki, 2000, pp. 31-38.

K. Hokkirigawa et al., "Development of New Linear Dry Sliding Bearing By Using RB Ceramics," Proceedings of the International Tribology Conference, 2000, pp. 845-849.

K. Hokkirigawa, "Friction and Wear Properties of New Tribo-Materails "RB Ceramics" Made From Rice Gran," Proceedings of the International Tribology Conference, pp. 839-843 (2000).

T. Akagaki, "Friction and Wear of Woodceramics Under Oil and Water Lubricated Sliding Contacts," Journal of Porous Materials 6, pp. 197-204 (1999).

M. Imura et al., "Large Magnetroresistance Effect in Isotropic Polycrystalline Pervoskite-Like La-AM-Mn-O (AM=K, Rb) Ceramics," Journal of the Ceramic Society of Japan 104, pp. 151-154 (1996).

D.F. Diao, "Fracture Mechanisms of Ceramic Coatings in Indentation," Journal of Tribology (1994), pp. 860-869.

K. Hokkirigawa, "Material Report R&D Development of Hard Porous Carbon Materials "RB Ceramics" by Using Rice Bran as Material," Functional Materials, May 1997, vol. 17, No. 5, pp. 24-28.

S. Toshinori, "Tetraflourethylene Resin Composition, " Patent No. JP11021407, Abstract.

T. Kato et al., "Wear Mode Transition of Hard Films On A1 Alloys Under Variable Normal Load," Surface Engineering 1997 vol. 13 No. 3, pp. 204-205.

European Search Report—EP 85 40 2169.

European Search Report—EP 03 07 5621.

International Search Report—PCT/US93/02051.

European Patent Office—Patent Abstract of Japan, Application No. 10049714, Pub. Date Feb. 20, 1998 for On-Board System.

EP—Communication dated Jul. 8, 2004 re. EP 1-251399.

European Communication dated Aug. 8, 2004 re: 03005714. 5-1267.

* cited by examiner

ELECTRICALLY MOTORIZED PUMP HAVING A SUBMERSIBLE SLEEVE BEARING

CROSS-REFERENCE TO RELATED APPLICATION

This application claims priority from the Japanese Patent Application No. 2003-065721, filed Mar. 11, 2003. This application is a continuation-in-part of U.S. patent application Ser. No. 10/387,021, filed Mar. 12, 2003.

BACKGROUND OF THE INVENTION

1. Field of the Invention

The present invention relates to an electric submersible pump for circulating cooling water in water-cooled engines. More specifically, the present invention relates to an electric submersible pump having a sleeve bearing that has a small coefficient of friction in water.

2. Description of Related Art

A conventional water pump for pumping cooling water in a closed cooling water circuit is driven by a crank shaft of an engine. The cooling water circuit includes a water jacket of the engine connected to a radiator of the engine. Such a conventional pump's rotation corresponds to the number of revolutions of the engine. The number of revolutions of such pump could not be controlled in a fine manner. Furthermore, when the engine stops, the pump stops immediately thereby causing troubles.

On the other hand, if a pump for use with water is driven by an electric motor, it is possible to arbitrarily control the number of revolutions and keep it running even when the engine is stopped. It is also possible to arbitrarily control the flow volume of cooling water passing through a radiator by electrically varying the degree of opening of a thermostatically controlled valve. Such a cooling control device for an engine has been disclosed in Japanese Patent Application Laid-Open No. 5-231148.

The conventional electrically motorized pump for use with water has a structure in which the impeller side and the rotor side of a pump are sealed to prevent water from flowing through. An O-ring made of rubber is placed between the impeller side and the rotor side or a sealing material is allowed to be in close contact with a rotary shaft. When the rotor is used at high revolutions for a long period of time, the O-ring deteriorates causing a loss in energy, also the sealing material, which is in close contact with the shaft causes a loss in energy.

Ceramics such as silicon nitride and alumina, and super-engineering plastics such as PPS that are conventionally used as the materials for underwater sleeve bearings possess a combination of mechanical properties, chemical properties and physical properties that are required for bearings for electric submersible pumps. However, there is room for improvement in terms of friction characteristics, productivity, and cost.

It is an object of the present invention to provide a submersible sleeve bearing demonstrating excellent corrosion resistance and friction characteristics when used in liquids without sealing, for example, in cooling water of a water-cooled engine, which is a water-ethylene glycol mixture.

It is yet another object of the present invention to provide an electric submersible pump which requires no sealing between the impeller side and rotor side of the pump, allows water to flow freely therethrough, makes it possible to reduce energy consumption, and effectively carries out the circulation of cooling water in water-cooled engines.

It is still another object of the present invention to provide an electric submersible pump using a sleeve bearing that is fabricated by employing a material demonstrating remarkable sliding properties in water, this material also having a small energy loss, excellent corrosion resistance, and low friction.

The above objects are achieved by improving upon materials described in an article (Kinou Zairyou (Functional Materials), May 1997 issue, Vol. 17, No. 5, pp 24 to 28) by one of the inventors of the present case, Mr. Kazuo Hokkirigawa, that discloses a porous carbon material made by using rice bran.

The above-mentioned reference describes an RB ceramic (referred to hereinbelow as RBC) and a manufacturing method thereof. The RBC is a carbon-based material obtained by mixing defatted bran obtained from rice bran with a thermosetting resin, blending the mixture, press molding, drying the molding, and firing the dry molding in an inactive gas atmosphere. Any thermosetting resin may be used in this process. Typical examples of such resins include phenolic resins, diarylphthalate resins, unsaturated polyester resins, epoxy resins, polyamide resins, and triazine resins. The phenolic resins are preferred. The mixing ratio of the defatted bran and the thermosetting resin in the mixture is 50–90:50–10, preferably 75:25. The firing temperature is 700–1000° C. Usually the firing is conducted in a rotary kiln, and the firing time is from about 40 min to 120 min.

The carbonized rice bran ceramic (referred to hereinbelow as CRBC) is a carbon-based material obtained by modification of the RB ceramic. The carbonized rice bran ceramic is obtained by mixing defatted bran obtained from rice bran and a thermosetting resin, primary firing the mixture in an inactive gas at a temperature of 700–1000° C. grinding to a size of not more than about 100 mesh to obtain a carbonized powder, mixing the carbonized powder with a thermosetting resin, press molding under a pressure of 20–30 MPa, and heat treating the molding again at a temperature of 500–1100° C. in an inactive atmosphere.

RBC and CRBC have the following excellent characteristics:
High hardness.
Oval shape even in the form of particles.
Very small expansion coefficient.
Porous structure.
Electric conductivity.
Low density and lightweight.
Very small friction coefficient.
Excellent wear resistance.
Small environmental impact because rice bran is used as a source material, leading to conservation of natural resources.

SUMMARY OF THE INVENTION

The present invention overcomes the deficiency of the prior art and provides an electric submersible pump in which a stator is accommodated in the outer peripheral space of a flanged housing and a flanged can seal. A rotor, a rotary shaft, and a sleeve bearing are accommodated in the inner space of the can seal. The sleeve bearing is mounted in a central hole of a substrate of the pump casing. The substrate is secured with the flanges of the housing and can seal, and an impeller is mounted on the distal end portion of the rotary shaft that is mounted inside the pump casing. The sleeve bearing is composed basically of a shaft and a sleeve and the sleeve or shaft is manufactured from a synthetic resin composition in which a fine powder of RBC or CRBC is dispersed homogeneously. The submersible sleeve bearing has improved mechanical properties, improved friction characteristics, productivity, and cost.

The synthetic resin composition obtained by mixing a synthetic resin with an RBC or CRBC reduced to a fine powder with a mean particle size of 300 μm or less, preferably 10–100 μm, even more preferably 10–50 μm, demonstrates exceptional sliding property in water.

More specifically, the resin composition in which a fine powder of RBC or CRBC is uniformly dispersed, in particular at a weight ratio of the fine powder of RBC or CRBC to a synthetic resin of 10–70:90–30, yields a molding resin, such that the sleeve bearing made from the molding resin demonstrates excellent wear characteristics in liquids such as water, alcohols, ethylene glycol, and mixtures thereof.

The typical process for the production of a synthetic resin composition for making the sleeve bearing for the pump for use in water includes kneading with a synthetic resin the fine powder of RBC or CRBC at a temperature in the neighborhood of the melting point of the resin, and thereby uniformly dispersing the fine powder of RBC or CRBC in the resin. A fiber-reinforced synthetic resin composition may also be used to make the sleeve bearing. The RBC can also be made using materials other than rice bran that can be a source of carbon. One example of such material is bran of another grain such as oat.

Further features and advantages will appear more clearly on a reading of the detailed description, which is given below by way of example only and with reference to the accompanying drawings wherein corresponding reference characters on different drawings indicate corresponding parts.

DETAILED DESCRIPTION OF THE INVENTION

Figure 1:
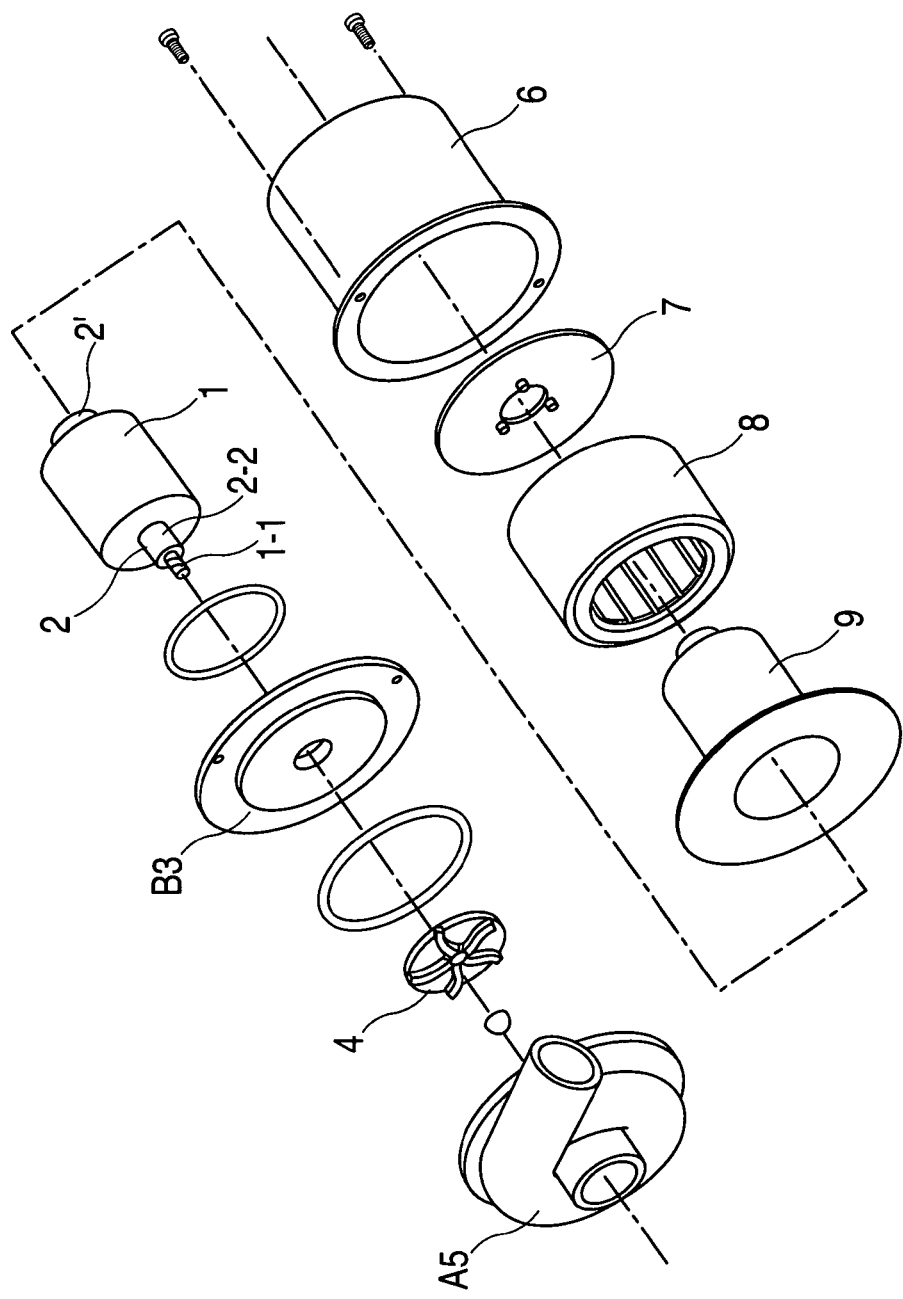
FIG. 1 is a schematic view of a submersible pump in accordance with the present invention.

FIG. 1 is a schematic drawing showing the assembly of a pump for use in water. Sleeve bearings 2 and 2' are mounted on a rotary shaft 1-1 to form a rotor assembly 1. An impeller 4 is fitted on a distal end portion of the rotary shaft 1-1 that protrudes from the central portion of a pump casting B3. An O-ring is located on each side of the pump casting B3. On the other hand, a stator assembly 8 is tightly closed in an outer peripheral watertight space formed by a flanged housing (with collar) 6 and a flanged can seal (with collar) 9 so as to prevent water from penetrating thereinto. A hall sensor assembly 7 is placed between the flanged housing 6 and stator assembly 8. The rotor assembly 1 is accommodated in the inner space of the flanged can seal 9. A submersible pump can be assembled by mounting the flanged housing 6, pump casting B3, and a flanged pump casing A5 in a manner that they sandwich the flanged can seal 9, and mounting the flanged pump casing B3 and the flanged housing 6 with fixing means such as bolts and nuts or screws. The pump assembly so formed allows fluid from impeller side to flow to the rotor side.

Figure 2:
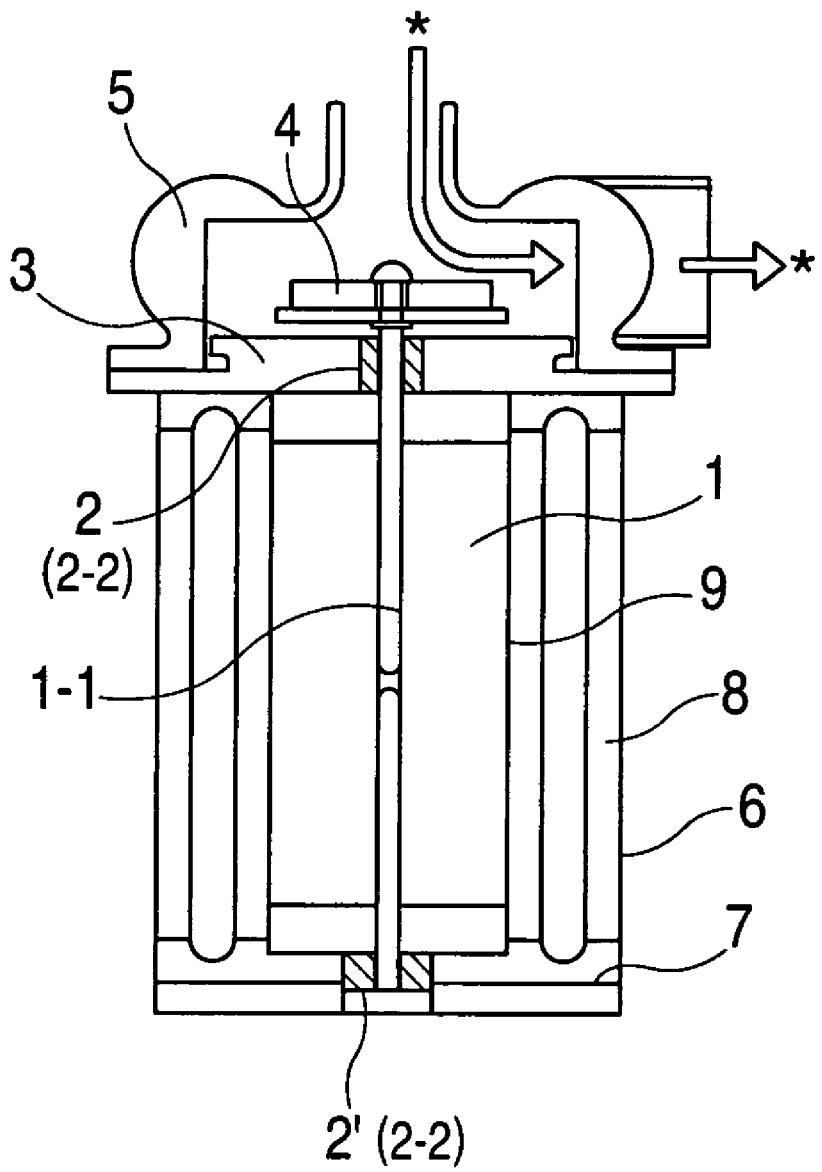
FIG. 2 is a cross-sectional view of a submersible pump in accordance with the present invention.

FIG. 2 is a cross-sectional view of the submersible pump. When electric current is passed through the stator 8, the rotor assembly 1 rotates, thereby rotating the rotary shaft 1-1, and the impeller 4, thereby supplying water into the cooling system of the engine. The sleeve bearing 2 is composed of the shaft 1-1 and a sleeve 2-2. The rotary shaft 1-1 or the sleeve 2-2 is fabricated by molding a synthetic resin composition prepared by uniformly dispersing a fine powder of RBC or CRBC in a synthetic resin. In addition to the shape of the sleeve bearing 2 shown in FIGS. 3 through 4, the sleeve bearing may have a sleeve of a well-known shape such as a flanged sleeve or the like.

Figure 4:
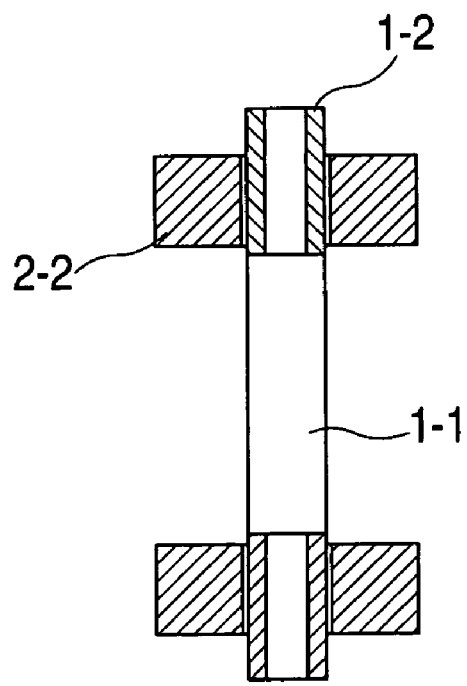
FIG. 4 is another example of a sleeve bearing.
Figure 5:
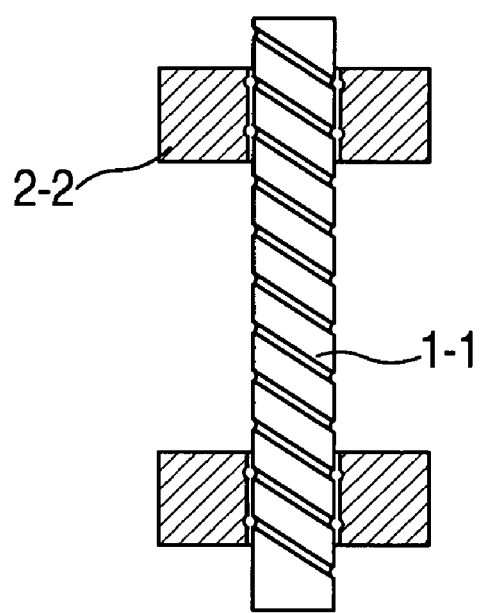
FIG. 5 is another example of a sleeve bearing.
Figure 6:
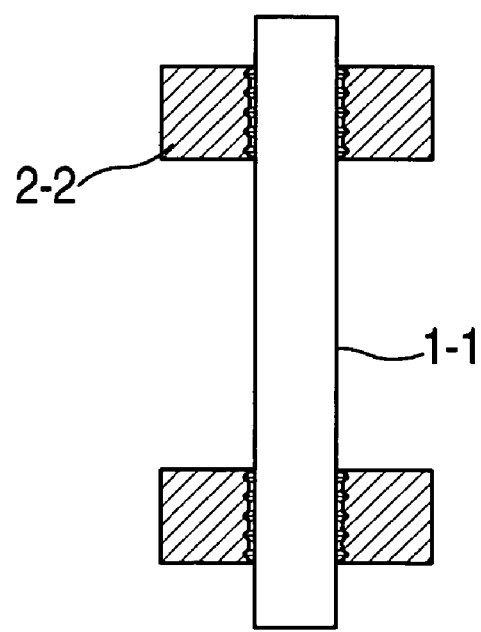
FIG. 6 is another example of a sleeve bearing.

In the present invention, an alloy such as a stainless steel is usually used for the shaft 1-1. When a hard shaft is required, the shaft 1-1 is subjected to quenching. As shown in FIG. 4, if necessary, a hard corrosion-resistant alloy 1-2 may be pressed into part of the shaft. Non-limiting examples of steel series metal that may be used for making shaft 1-1 or sleeve 2-2 are stainless steel type alloy of iron, nickel, chrome, and molybdenum. Any alloy, as long as it is hard and difficult to rust, can be used. Furthermore, the shaft 1-1 may also be fabricated from the aforesaid synthetic resin composition.

The fine powder of RBC or CRBC that is used in the present invention has a mean particle size of 300 μm or less. In particular, the fine powder with a mean particle size of 10–100 μm, more preferably 10–50 μm, provides a surface state with good friction coefficient and is preferred as a material for submersible sliding sleeve bearings.

Examples of synthetic resins that can be used in accordance with the present invention include thermoplastic resins such as polyamides, polyesters, and polyolefins. Specific examples include thermoplastic resins such as aromatic nylons such as Nylon 66 (polyhexamethyleneadipamide), Nylon 6 (polycapramide), Nylon 11 (polyundecaneamine), Nylon 12, polyphthalamide, and polyacetals, polybutylene terephthalate, polyethylene terephthalate, polypropylene, polyethylene, and polyphenylene sulfide. Nylon 66 is the preferred synthetic resin. The thermoplastic resins may be used individually or in combination of two or more thereof.

Furthermore, the strength of the molding can be increased by adding inorganic fibers such as glass fibers, rock wool, and carbon fibers, organic fibers such as polyester, rayon, polyvinyl alcohol, polyamide, polyolefin, acryl, or aramide fibers, or natural pulp fibers such as wood pulp and Manila hemp to the synthetic resin composition used in the underwater bearing in the present invention. Commercial fibers can also be used, and either long or short fibers can be used. The fibers can be blended at a ratio of 0.1–100 wt. % based on the entire composition but a range of 1 to 30 wt. % is preferred from the standpoint of strength and friction characteristics.

A thermosetting resin can also be used without departing from the essence of the present invention. Examples of such thermosetting resins include phenolic resins, diarylphthalate resins, unsaturated polyester resins, epoxy resins, polyamide resins, and triazine resins.

In the present invention, the preferred weight ratio of the fine powder of RBC or CRBC to the synthetic resin is 10–70:90–30. If the addition ratio of the synthetic resin exceeds 90 wt. %, the target low friction resistance characteristics are not obtained, and if this ratio is less than 30 wt. %, molding becomes difficult.

Molding is usually conducted by an extrusion or injection molding process. A low temperature of the die is preferable. Basically, the temperature may be within a range from glass transition temperature to the melting temperature of the synthetic resin. A molding with better friction characteristics could be obtained by conducting gradual rather than rapid cooling of the die.

The present invention will be described hereinbelow in greater detail based on working examples thereof.

WORKING EXAMPLE 1

Preparation of Fine Powder of RBC

A total of 750 g of defatted bran obtained from rice bran and 250 g of a liquid phenolic resin (resol) were mixed and blended while being maintained at a temperature of 50–60° C. As a result, a homogeneous mixture having plasticity was obtained.

The mixture was baked for 100 minutes at a temperature of 900° C. in nitrogen atmosphere in a rotary kiln to obtain carbonized fired material. The carbonized fired material was ground with a grinding machine and passed through a 150-mesh sieve to obtain a fine powder of RBC with a mean particle size of 140–160 $\mu$m.

Preparation of a Composition Containing Fine Powder of RBC and Synthetic Resin

A total of 500 g of the above obtained fine powder of RBC and 500 g of Nylon 66 powder were mixed and blended while being maintained at a temperature of 240–290° C. As a result, a homogeneous mixture having plasticity was obtained. The content ratio of the fine powder of RBC was 50 wt. %.

Fabrication of Sleeve Bearing and Application to Submersible Pump

The resin composition obtained by melting and mixing the fine powder of RBC and Nylon 66 was injection molded to obtain a sleeve with an outer diameter of 22 mm, an inner diameter of 8 mm, and a length of 20 mm. A sleeve bearing shown in FIG. 3 was then fabricated by inserting a SUS303 stainless steel shaft with an outer diameter of 7.95 mm and a length of 200 mm in the sleeve. The sleeve bearings thus obtained were used as the sleeve bearings 2, 2' of the rotor assembly, as shown in FIGS. 1 and 2.

WORKING EXAMPLE 2

A fine powder of RBC with a mean particle size of 140–160 $\mu$m was obtained by using the method described in Working Example 1.

Preparation of a Composition Containing Fine Powder of RBC and Synthetic Resin

A total of 700 g of the above fine powder of RBC and 300 g of Nylon 66 powder were mixed and blended while being maintained at a temperature of 240–290° C. As a result, a homogeneous mixture having plasticity was obtained. The content ratio of the fine powder of RBC was 70 wt. %.

Fabrication of Sleeve Bearing and Application to Submersible Pump

The resin composition obtained by mixing and melting the fine powder of RBC and Nylon 66 was injection molded to obtain a sleeve with an outer diameter of 22 mm, an inner diameter of 8 mm, and a length of 20 mm. A sleeve bearing shown in FIG. 3 was then fabricated by inserting in the sleeve a SUS304 stainless steel shaft with an outer diameter of 7.95 mm and a length of 200 mm. The sleeve bearings thus obtained were used as the sleeve bearings 2, 2' of the rotor assembly, as shown in FIGS. 1 and 2.

WORKING EXAMPLE 3

Preparation of Fine Powder of RBC

A total of 750 g of defatted bran obtained from rice bran and 250 g of a liquid phenolic resin (resol) were mixed and blended while being maintained at a temperature of 50–60° C. As a result, a homogeneous mixture having plasticity was obtained.

The mixture was baked for 100 min at a temperature of 1000° C. in nitrogen atmosphere in a rotary kiln to obtain carbonized fired material. The carbonized fired material was ground with a grinding machine and passed through a 400-mesh sieve to obtain a fine powder of RBC with a mean particle size of 30–50 $\mu$m.

Preparation of a Composition Containing Fine Powder of RBC and Synthetic Resin

A total of 700 g of the obtained fine powder of RBC and 300 g of a Nylon 66 powder were mixed and blended while being maintained at a temperature of 240–290° C. As a result, a homogeneous mixture having plasticity was obtained. The content ratio of the fine powder of RBC was 70 wt. %.

Fabrication of Sleeve Bearing and Application to Submersible Pump

The resin composition obtained by melting and mixing the fine powder of RBC and Nylon 66 was injection molded to obtain a sleeve with an outer diameter of 22 mm, an inner diameter of 8 mm, and a length of 120 mm. A sleeve bearing shown in FIG. 3 was then fabricated by inserting in a sleeve a SUS bearing steel shaft with an outer diameter of 7.95 mm and a length of 200 mm. The sleeve bearings thus obtained were used as the sleeve bearings 2, 2' of the rotor assembly, as shown in FIGS. 1 and 2.

WORKING EXAMPLE 4

Preparation of Fine Powder of CRBC

A total of 750 g of defatted bran obtained from rice bran and 250 g of a liquid phenolic resin (resol) were mixed and blended while being maintained at a temperature of 50–60° C. As a result, a homogeneous mixture having plasticity was obtained. The mixture was baked for 60 min at a temperature of 900° C. in nitrogen atmosphere in a rotary kiln to obtain carbonized fired material. The carbonized fired material was ground with a grinding machine and passed through a 200-mesh sieve to obtain a fine powder of RBC with a mean particle size of 100–120 $\mu$m.

A total of 750 g of the obtained fine powder of RBC and 500 g of a solid phenolic resin (resol) were mixed and blended while being maintained at a temperature of 100–150° C. As a result, a homogeneous mixture having plasticity was obtained. The plastic material was then pressure molded under a pressure of 22 MPa to obtain spheres with a diameter of about 1 cm. The molding die temperature was 150° C.

The molding was removed from the die, the temperature thereof was raised to 500° C. at a heating rate of 1° C./min in nitrogen atmosphere, followed by holding for 60 min at a temperature of 500° C. and sintering for about 120 min at a temperature of 900° C. The temperature was then reduced to 500° C. at a rate of 2–3° C./min. Once the temperature has become less than 500° C., the material was cooled naturally.

The obtained CRBC molding was ground with a grinding machine and classified with a 500-mesh sieve to obtain a fine powder of CRBC with a mean particle size of 20–30 μm.

Preparation of Composition Containing Fine Powder of CRBC and Synthetic Resin

A total of 500 g of the obtained fine powder of CRBC and 500 g of Nylon 66 powder were mixed and blended while being maintained at a temperature of 240–290° C. As a result, a homogeneous mixture having plasticity was obtained. The content ratio of the fine powder of CRBC was 50 wt. %.

Fabrication of Sleeve Bearing and Application to Submersible Pump

The synthetic resin composition obtained by melting and mixing the fine powder of CRBC and Nylon 66 was injection molded to obtain a sleeve with an outer diameter of 22 mm, an inner diameter of 8 mm, and a length of 20 mm. A sleeve bearing shown in FIG. 4 was then fabricated by inserting in the sleeve a shaft that was obtained by press fitting a SUS304 stainless steel cylindrical member with an outer diameter of 7.95 mm, an inner diameter of 5.00 mm, and a length of 20 mm onto both ends of a steel shaft with a length of 200 mm. The sleeve bearings thus obtained were used as the sleeve bearings 2, 2' of the rotor assembly, as shown in FIGS. 1 and 2.

The compositions consisting of the fine powder of RBC or CRBC and a synthetic resin used in the Working Examples 5 through 10 were produced in the same manner as in Working Examples 1 through 4 under the conditions shown in Table 1. Further, for comparison purpose, a commercial PPS resin (manufactured by Idemitsu Petrochemicals Co.) for commercial pumps and silicon nitride were used to make sleeve bearings of comparative examples 1 and 2.

TABLE 1

| | Composition 5 | Composition 6 | Composition 7 | Composition 8 | Composition 9 | Composition 10 | Comparative Example 1 | Comparative Example 2 |
|---|---|---|---|---|---|---|---|---|
| Type of fine powder of RBC, CRBC | Powder used in Working Example 4 | Powder used in Working Example 3 | Powder used in Working Example 1 | Powder used in Working Example 2 | Powder used in Working Example 2 | Powder used in Working Example 1 | — | — |
| Synthetic resin | Nylon 66 | PBT | PP | PPS | Nylon 66 | Nylon 66 containing 23% GF | PPS | $Si_3N_4$ |
| Fine powder: resin (weight ratio) | 70:30 | 50:50 | 70:30 | 50:50 | 30:70 | 10:90 | — | — |

Properties of the compositions consisting of fine powder of RBC or CRBC and synthetic resins that were used in the sleeve bearings for underwater pumps of Working Examples 1 through 10 and those of the PPS resin and silicon nitride are shown in Table 2.

TABLE 2

| | Tensile strength (MPa) | Bending strength (MPa) | Modulus of elasticity in bending (GPa) | Resistivity (Ohm-cm) | Specific gravity |
|---|---|---|---|---|---|
| Composition of Working Example 1 | 64.6 | 98.6 | 6.12 | 4.90E+01 | 1.35 |
| Composition of Working Example 2 | 61.4 | 97.6 | 6.14 | 3.20E+01 | 1.38 |
| Composition of Working Example 3 | 76.5 | 120.0 | 8.85 | 2.10E+01 | 1.43 |
| Composition of Working Example 4 | 75.9 | 117.0 | 8.56 | 3.40E+01 | 1.38 |
| Composition of Working Example 5 | 58.2 | 105.0 | 4.12 | 3.30E+01 | 1.27 |
| Composition of Working Example 6 | 49.6 | 72.3 | 7.50 | 3.30E+01 | 1.46 |
| Composition of Working Example 7 | 22.7 | 44.3 | 6.50 | 3.80E+01 | 1.32 |
| Composition of Working Example 8 | 79.2 | 121.0 | 7.60 | 4.00E+01 | 1.48 |
| Composition of Working Example 9 | 57.3 | 101.0 | 4.30 | 2.70E+01 | 1.24 |
| Composition of Working Example 10 | 104.0 | 163.0 | 6.69 | — | 1.42 |
| PPS of comparative Example 1 | 159.0 | 235.0 | 14.1 | 1.00E+16 | 1.75 |
| $Si_3N_4$ of comparative Example 2 | — | 735.5 | 294.2 | 1.00E+16 | 3.20 |

WORKING EXAMPLE 5

A sleeve with an outer diameter of 22 mm, an inner diameter of 8 mm, and a length of 20 mm having a spiral groove with a depth of 0.1 mm on the inner side of the sleeve was fabricated by injection molding the composition 5 shown in Table 1. A sleeve bearing shown in FIG. 3 was fabricated by inserting in the sleeve a SUS bearing steel shaft with an outer diameter of 7.95 mm and a length of 200 mm. The sleeve bearings thus obtained were used as the sleeve bearings 2, 2' of the rotor assembly, as shown in FIGS. 1 and 2.

WORKING EXAMPLE 6

A shaft with an outer diameter of 7.95 mm and a length of 200 mm was fabricated by injection molding the composition 6 shown in Table 1. A sleeve with an outer diameter of 22 mm, an inner diameter of 8 mm, and a length of 120 mm was then fabricated from a SUS bearing steel and the two were assembled to obtain a sleeve bearing shown in FIG. 3. The sleeve bearings thus obtained were used as the sleeve bearings 2, 2' of the rotor assembly, as shown in FIGS. 1 and 2.

WORKING EXAMPLE 7

A shaft with an outer diameter of 7.95 mm and a length of 200 mm having a spiral groove with a depth of 0.1 mm was fabricated by injection molding the composition 7 shown in Table 1. A sleeve with an outer diameter of 22 mm, an inner diameter of 8 mm, and a length of 120 mm was fabricated from a SUS bearing steel and the two were assembled to obtain a sleeve bearing shown in FIG. 3. The sleeve bearings thus obtained were used as the sleeve bearings 2, 2' of the rotor assembly, as shown in FIGS. 1 and 2.

WORKING EXAMPLE 8

A sleeve with an outer diameter of 22 mm, an inner diameter of 8 mm, and a length of 20 mm was fabricated by injection molding the composition 8 shown in Table 1. A sleeve bearing was fabricated by inserting a shaft with an outer diameter of 7.95 mm and a length of 200 mm that was made from a SUS bearing steel and had a spiral groove with a depth of 0.1 mm. The sleeve bearings thus obtained were used as the sleeve bearings 2, 2' of the rotor assembly, as shown in FIGS. 1 and 2.

WORKING EXAMPLE 9

A shaft with an outer diameter of 7.95 mm and a length of 200 mm having a spiral groove with a depth of 0.1 mm was fabricated by injection molding the composition 9 shown in Table 1. A sleeve with an outer diameter of 22 mm, an inner diameter of 8 mm, and a length of 120 mm was fabricated from a SUS bearing steel and the two were assembled to obtain a sleeve bearing shown in FIG. 3. The sleeve bearings thus obtained were used as the sleeve bearings 2, 2' of the rotor assembly, as shown in FIGS. 1 and 2.

WORKING EXAMPLE 10

Fabrication of Sleeve Bearing and Application to Submersible Pump

Figure 3:
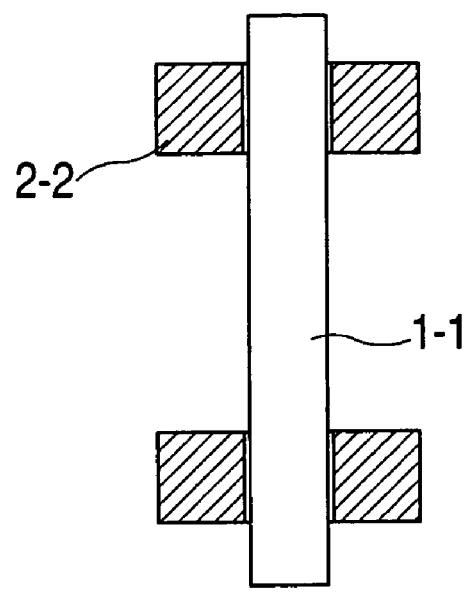
FIG. 3 is one example of a sleeve bearing.

A resin composition was obtained by uniformly melting and mixing 23 g of commercial short glass fibers, and 77 g of Nylon 66 pellets. A total of 90 g of the resin composition obtained was melted and mixed with 10 g of a fine powder of RBC with a mean particle size of 150 $\mu$m to obtain the composition 10 in Table 1. The composition 10 was used as a starting material resin, and injection molded to obtain a sleeve with an outer diameter of 22 mm, an inner diameter of 8 mm, and a length of 120 mm. A sleeve bearing as shown in FIG. 3 was fabricated by inserting in the sleeve a SUS 303 stainless steel shaft with an outer diameter of 7.95 mm and a length of 200 mm. The sleeve bearings thus obtained were used as the sleeve bearings 2, 2' of the rotor assembly, as shown in FIGS. 1 and 2.

COMPARATIVE EXAMPLE 1

A sleeve with an outer diameter of 22 mm, an inner diameter of 8 mm, and a length of 120 mm was fabricated by injection molding a commercial PPS resin (manufactured by Idemitsu Petrochemicals Co.) for underwater pumps. A sleeve bearing as shown in FIG. 1 was fabricated by inserting in the sleeve a SUS 303 stainless steel shaft with an outer diameter of 7.95 mm and a length of 200 mm. The sleeve bearings thus obtained were used as the sleeve bearings 2, 2' of the rotor assembly, as shown in FIGS. 1 and 2.

COMPARATIVE EXAMPLE 2

A sleeve with an outer diameter of 22 mm, an inner diameter of 8 mm, and a length of 120 mm was fabricated from silicon nitride. A sleeve bearing as shown in FIG. 1 was fabricated by inserting in the sleeve a SUS 303 stainless steel shaft with an outer diameter of 7.95 mm and a length of 200 mm.

Wear characteristics of sleeve bearings for underwater applications that were obtained in Working Examples 1 through 10 and comparative examples 1 and 2 are shown in Table 3.

TABLE 3

| | | Working Example 1 | Working Example 2 | Working Example 3 | Working Example 4 | Working Example 5 | Working Example 6 | Working Example 7 | Working Example 8 | Working Example 9 | Working Example 10 | Comparative Example 1 | Comparative Example 2 |
|---|---|---|---|---|---|---|---|---|---|---|---|---|---|
| Friction coeff. $\mu$ | A | 0.063 | 0.082 | 0.103 | 0.088 | 0.124 | 0.105 | 0.091 | 0.082 | 0.081 | 0.170 | 0.219 | 0.481 |
| | B | 0.063 | 0.078 | 0.091 | 0.092 | 0.120 | 0.097 | 0.091 | 0.081 | 0.078 | 0.120 | 0.219 | 0.456 |
| | C | 0.059 | 0.084 | 0.081 | 0.078 | 0.118 | 0.100 | 0.088 | 0.077 | 0.078 | 0.095 | 0.213 | 0.456 |
| | D | 0.096 | 0.104 | 0.108 | 0.078 | 0.110 | 0.091 | 0.089 | 0.082 | 0.090 | 0.125 | 0.250 | 0.450 |
| | E | 0.050 | 0.076 | 0.096 | 0.067 | 0.086 | 0.088 | 0.075 | 0.065 | 0.050 | 0.125 | 0.121 | 0.350 |
| | F | 0.062 | 0.085 | 0.080 | 0.061 | 0.081 | 0.092 | 0.075 | 0.069 | 0.066 | 0.088 | 0.123 | 0.380 |

The numerical values of A–F in the table were measured under the following conditions.

A: measurements under the condition of sliding speed of 0.001 m/sec.
B: measurements under the condition of sliding speed of 0.005 m/sec.
C: measurements under the condition of sliding speed of 0.01 m/sec.
D: measurements under the condition of sliding speed of 0.1 m/sec.
E: measurements under the condition of sliding speed of 0.5 m/sec.
F: measurements under the condition of sliding speed of 1.0 m/sec.

Additional synthetic resin compositions were manufactured by using the fine powder of RBC with a mean particle size of 150 μm that was obtained in Working Example 1 and the fine powder of CRBC with a mean particle size of 30 μm that was obtained in Working Example 3 and blending them with Nylon 6, Nylon 11, polyphthalamide, polybutylene terephthalate, polyethylene terephthalate, polypropylene, polyethylene, and polyacetal (POM). The samples were then fabricated and similar tests were conducted. The trends observed were almost identical to those represented by the results shown in Table 3.

The results tabulated in Table 3 show that the electric submersible pumps produced from the fine powder of RBC or CRBC and a synthetic resin or fiber-reinforced synthetic resin in accordance with the present invention demonstrate the following:

1. Reduced friction coefficient.
2. Decreased difference in friction coefficients at a low sliding speed range and at a high sliding speed range.
3. Improved mechanical properties when a fiber-reinforced synthetic resin is used.
4. Excellent production efficiency is obtained because injection molding is possible.
5. Low cost.

While a preferred embodiment of the invention has been described, various modifications will be apparent to one skilled in the art in light of this disclosure and are intended to fall within the scope of the appended claims.

We claim:

1. An electrically motorized pump for use in a fluid comprising:
   a motor;
   a pump coupled to the motor; and
   at least one sleeve bearing that rotatably supports the motor or the pump, wherein a portion of the sleeve bearing is made of a synthetic resin composition obtained by uniformly blending powder of RBC or CRBC with a resin.

2. The electrically motorized pump of claim 1, wherein the synthetic resin composition further comprises fibers, the fibers being uniformly blended with the RBC or CRBC and resin.

3. The electrically motorized pump of claim 2, wherein the sleeve bearing comprises a shaft and a sleeve and at least the shaft or the sleeve is made of the synthetic resin composition.

4. The electrically motorized pump of claim 3, further comprising:
   a housing with collar;
   a can seal with collar, the can seal being mounted on the housing; and
   a stator, the stator being mounted in an outer peripheral space between the housing and the can seal.

5. The electrically motorized pump of claim 4, further comprising:
   a rotor;
   an impeller mounted on the shaft; and
   at least one sleeve rotatably mounted on the shaft, the shaft and the sleeve forming the sleeve bearing and the rotor being rotatably supported by the sleeve bearing forming a rotor assembly, the rotor assembly being located in an inner space of the can seal.

6. The electrically motorized pump of claim 5, wherein a fluid may freely flow from the impeller side to the rotor side.

7. The electrically motorized pump of claim 5, wherein the synthetic resin composition has a ratio by mass of fine powder of RBC or CRBC to the resin of 30 to 90:70 to 10.

8. The electrically motorized pump of claim 5, wherein the fibers are selected from a group consisting of inorganic fibers and organic fibers.

9. The electrically motorized pump of claim 5, wherein the fibers are selected from a group consisting of fibers of varying lengths.

10. The electrically motorized pump of claim 5, wherein the content ratio of fibers is 1–30% by weight based on weight of the entire synthetic resin composition.

11. The electrically motorized pump of claim 5, wherein the fibers are glass fiber.

12. The electrically motorized pump of claim 5, wherein the sleeve of the sleeve bearing has at least one spiral groove on the inner face of the sleeve.

13. The electrically motorized pump of claim 5, wherein the shaft has at least one spiral groove on its surface.

14. The electrically motorized pump of claim 5, wherein at least the shaft or the sleeve is made of the synthetic resin composition.

15. The electrically motorized pump of claim 7, wherein the resin used in making the sleeve is selected from a group consisting of Nylon 66, Nylon 6, Nylon 11, Nylon 12, polyphthalamide, polyacetal, polybutylene terephthalate, polyethylene terephthalate, polypropylene, polyethylene, and polyphenylene sulfide.

16. The electrically motorized pump of claim 7, wherein the resin used in making the sleeve includes at least two members of the group consisting of Nylon 66, Nylon 6, Nylon 11, Nylon 12, polyphthalamide, polyacetal, polybutylene terephthalate, polyethylene terephthalate, polypropylene, polyethylene, and polyphenylene sulfide.

17. The electrically motorized pump of claim 7, wherein the average particle diameter of the powder of RBC or CRBC is 300 μm or less.

18. The electrically motorized pump of claim 7, wherein the average particle diameter of the powder of RBC or CRBC is 10 to 50 μm.

19. The electrically motorized pump of claim 7, wherein the shaft is made of corrosion-resistant steel type metal.

20. The electrically motorized pump of claim 7, wherein at least one of the shaft and the sleeve is made of the synthetic resin composition.

21. The electrically motorized pump of claim 20, wherein the resin used in making the shaft is selected from a group consisting of nylon 66, nylon 6, nylon 11, nylon 12, poly acetal, poly butylenes terephthalate, polyethylene terephthalate, polypropylene, polyethylene, and poly phenylene sulfide.

22. The electrically motorized pump of claim 20, wherein the resin used in making the shaft includes at least two members of the group consisting of nylon 66, nylon 6, nylon 11, nylon 12, poly acetal, poly butylenes terephthalate, polyethylene terephthalate, polypropylene, polyethylene, and poly phenylene sulfide.

* * * * *